(12) United States Patent
Wensing

(10) Patent No.: US 7,011,168 B2
(45) Date of Patent: Mar. 14, 2006

(54) HOLE FORMING TOOL

(75) Inventor: Eric Wensing, Evatt (AU)

(73) Assignee: Gary Laneyrie, Dapto (AU)

( * ) Notice: Subject to any disclaimer, the term of this patent is extended or adjusted under 35 U.S.C. 154(b) by 31 days.

(21) Appl. No.: 10/631,048

(22) Filed: Jul. 29, 2003

(65) Prior Publication Data

US 2004/0128865 A1 Jul. 8, 2004

(30) Foreign Application Priority Data

Jul. 30, 2002 (AU) .............................. 2002950447

(51) Int. Cl.
- *A01C 23/02* (2006.01)
- *E21B 41/00* (2006.01)
- *E21B 43/114* (2006.01)
- *E21B 7/18* (2006.01)

(52) U.S. Cl. ..................... 175/424; 111/7.3; 111/7.4

(58) Field of Classification Search ................ 111/118, 111/119, 7.1–7.4, 127–129; 405/248, 232; 175/67, 71, 124, 69

See application file for complete search history.

(56) References Cited

U.S. PATENT DOCUMENTS

| | | | | | |
|---|---|---|---|---|---|
| 1,173,355 | A | * | 2/1916 | Jones | .......................... 405/248 |
| 3,674,100 | A | * | 7/1972 | Becker | ......................... 175/69 |
| 3,753,408 | A | * | 8/1973 | Zimmerman | .................. 111/7.1 |
| 3,916,634 | A | * | 11/1975 | Woodruff | ..................... 405/248 |
| 6,231,270 | B1 | * | 5/2001 | Cacossa | ....................... 405/248 |
| 6,457,905 | B1 | * | 10/2002 | Nickell | ..................... 405/128.5 |

* cited by examiner

*Primary Examiner*—Christopher J. Novosad
(74) *Attorney, Agent, or Firm*—Timothy J Keefer; Seyfarth Shaw LLP

(57) ABSTRACT

A hole forming tool is disclosed utilizing compressed gas discharged into a shaped shroud resulting in minimal disturbance to the surrounding ground.

6 Claims, 2 Drawing Sheets

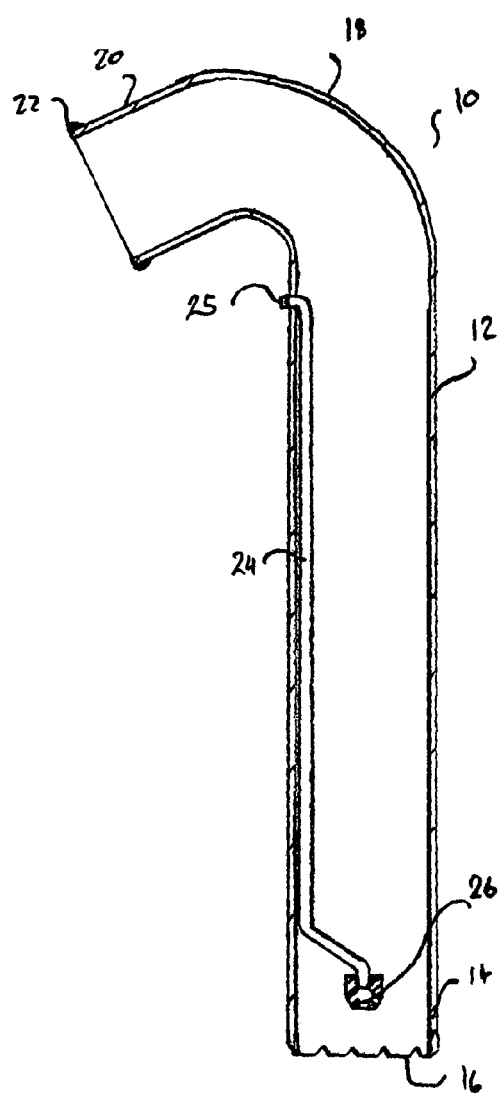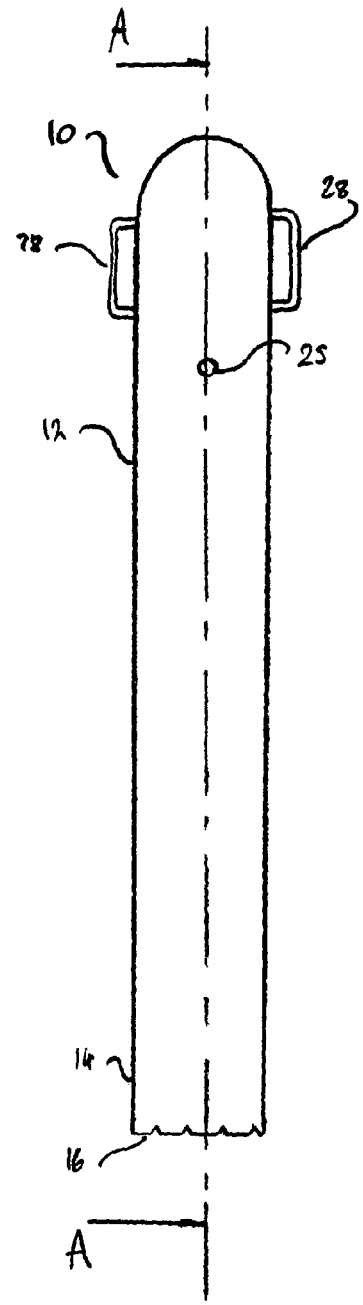
Fig. 2
Fig. 1

HOLE FORMING TOOL

TECHNICAL FIELD

This invention relates to a hole forming tool.

BACKGROUND TO THE INVENTION

It is sometimes necessary to make a hole in the ground and in an area where the ground surface is soil, or a material having similar mechanical properties to soil. This could be for a variety of reasons including for the creation of a pot-hole to inspect buried services such as electricity, gas and water, or for the inspection of tree roots or buried rock, or for providing a mounting hole for a fence post or for planting trees.

Currently, implements such as picks, shovels and crow bars are used to make such holes in the ground. However, these implements are labour intensive and use of these implements often disturbs a larger area than needed and can result in damage to underground services.

It has been tried to use water based methods to make holes in the ground. However, these require the removal of the resultant sullage, which can be messy and time consuming.

SUMMARY OF THE INVENTION

The present invention provides a hole forming tool including a hollow shroud having a ground engaging portion for engaging a soil surface; a compressed gas delivery means including an outlet disposed within the shroud; the outlet is disposed at a position within the shroud so that when the ground engaging portion of the shroud is driven into soil, compressed gas emanating from the outlet disrupts the soil inside the shroud to form a hole in the soil.

In this way, a smooth sided hole is formed with the assistance of compressed gas. Minimal disturbance is made to the surrounding ground. The sides of the resultant hole conform with the outer dimensions of the shroud.

The tube may be bent at a location spaced from the ground engaging portion to direct the disrupted soil away from the hole.

The outlet may be a nozzle including more than one flow path through which compressed gas can emanate from the nozzle. The provision of multiple flow paths assists in the breaking up of the soil by the compressed gas.

The ground engaging portion of the shroud may be provided with blunt serrations spaced around its periphery. These blunt serrations serve to assist in the break up of soil whilst causing minimal damage to any underground object that may be struck by the teeth during excavation.

BRIEF DESCRIPTION OF THE DRAWINGS

An embodiment of the present invention will now be described, by way of example only, with reference to the accompanying drawings, in which:

FIG. 1 is an elevation view of an embodiment of a hole forming tool according to the present invention; and FIG. 2 is a cross section view along the line A—A of FIG. 1;

DETAILED DESCRIPTION OF THE PREFERRED EMBODIMENT

Figure 3:
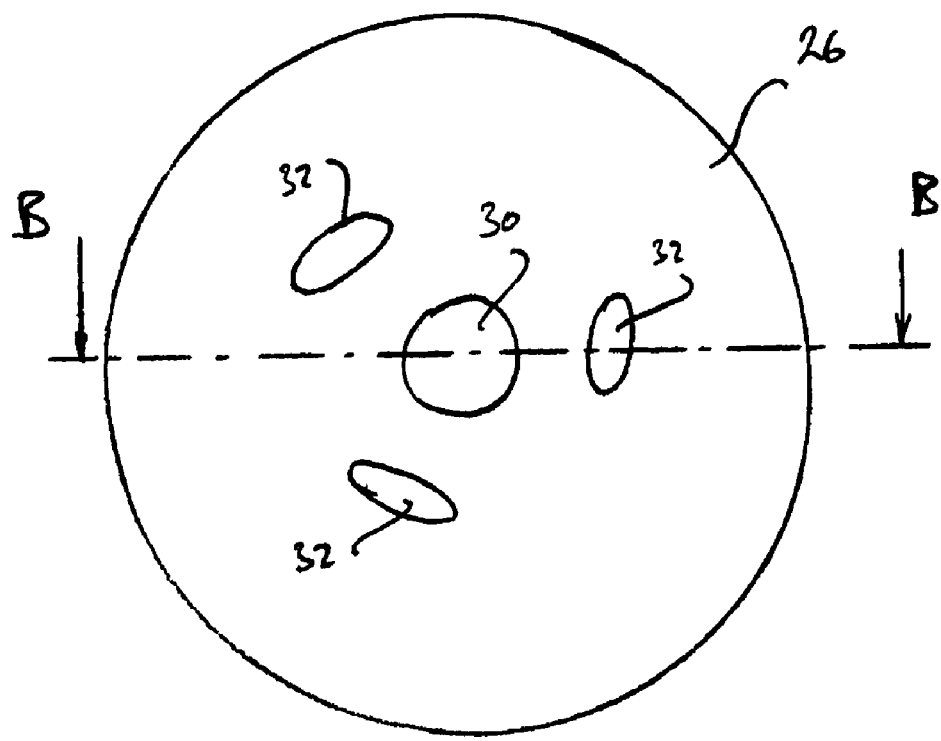
FIG. 3 is an underside view of the nozzle of FIG. 2.

Referring to FIGS. 1 and 2, a hole forming tool 10 is shown including a hollow shroud in the form of steel tube 12. Tube 12 has a diameter of 100 mm and a length of 1800 mm. Tube 12 has a ground engaging portion 14 that is provided with blunt serrated teeth 16 around its periphery. Tube 12 is bent at a point 18 spaced away from ground engaging portion 14. Exhaust portion 20 is provided with a rim 22 for receiving a vacuum hose (not shown) by way of a cam lock.

Tool 10 includes a compressed gas delivery means including pipe 24 and nozzle 26. Pipe 24 is made from steel and has a diameter of about 12 mm. Pipe 24 enters tube 12 at a point just below bend portion 18 and is affixed to the inside of tube 12. At a point about 150 mm from the lower end of tube 12 pipe 24 is bent towards the centre of tube 12. Pipe 24 is provided with an outlet at its lower end in the form of nozzle 26 which is a screw threaded fit to pipe 24. Nozzle 26 is disposed in the centre of the bore of tube 12 about 30 mm from the lower end of tube 12. A locknut (not shown) is used to secure nozzle 26 at the correct position on pipe 24. The upper end of pipe 24 is provided with a suitable fitting 25 to receive an air hose from an air compressor.

Tool 10 includes a pair of handles 28.

Figure 4:
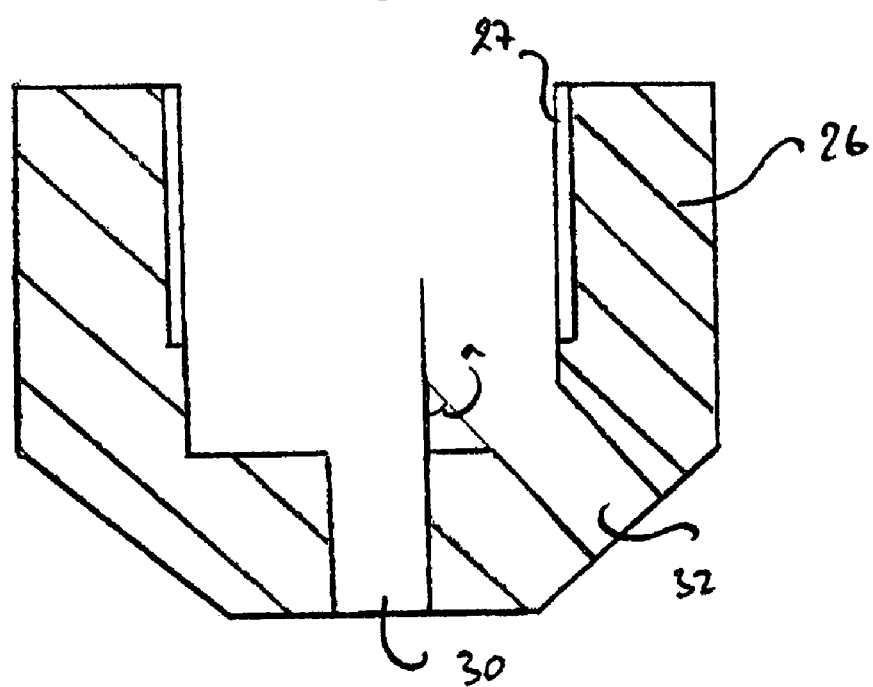
FIG. 4 is a cross section view along the line B—B of FIG. 3.

Referring to FIGS. 3 and 4, nozzle 26 is shown in greater detail. Nozzle 26 includes a threaded portion 27 for affixing to pipe 24. Nozzle further includes a central flow path 30 of 4 mm diameter and peripheral flow paths 32 which are offset from flow path 30 by angle a. In this embodiment angle a is 25 degrees. Peripheral flow paths 32 have a diameter of 2 mm and are equally spaced about central flow path 30.

To form a hole with tool 10, the tool 10 is stood on the ground at about 90 degrees to the ground in the position where the hole is to be made. Compressed gas in the form of compressed air at about 100 PSI is applied to fitting 25. By grasping handles 28, the tool is rotated in alternate directions through an angle of about 60 degrees about the central upright axis of tube 12.

As a result of the rotation of tool 10, blunt serrations 16 break up the soil and, as the tool descends into the soil, the compressed air emanating from nozzle 26 excavates the ground in the region of nozzle 26. The soil which is excavated is broken down and forced upwards and out of exhaust end 20 by the compressed air. A hose may be attached to rim 22 is run to a drum, which traps soil leaving exhaust end 20.

For heavy soil, a vacuum pump may be used to assist in drawing excavated soil out of exhaust end 20. The vacuum pump may be connected directly to a hose attached to rim 22, or may be attached to draw air from the drum, if used. In the case of wet material the connection between the tool 10 and the vacuum pump may be filtered.

During excavation the tool is continued to be rotated in alternate rotational directions through 60 degrees to assist in the excavation and to help locate any solid object in the ground.

It can be seen that the invention described herein provides a convenient low impact tool for forming holes in ground with reduced manual effort and with minimal disturbance to surrounding ground and to buried objects.

Nozzles of different configurations to the nozzle illustrated may be employed depending upon the physical characteristics of the soil structure to be excavated.

The shroud employed in the above described preferred embodiment is in the form of a steel tube which completely surrounds and encloses the nozzle. It is not strictly necessary to completely enclose the nozzle and an open section shroud could be employed. The important factor is that the shroud defines the outer dimensions of the formed hole.

Similarly, alternative arrangements to blunt serrations at the ground engaging end of the shroud can be employed. The important factor is that the ground engaging portion of the shroud assists with cutting into the ground to define the outer dimensions of the hole to be formed whilst minimising damage to underground objects. For instance, resilient plastic fingers could be used instead of blunt serrations.

Whilst the invention has been described above with reference to forming a hole in soil, the tool can be used to form a hole in any substance that has similar mechanical properties to soil.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The claims defining the invention are as follows:

1. A hole forming tool including: a hollow tube having a ground engaging portion for engaging a soil surface; a compressed gas delivery means including an outlet disposed within the tube; the tube includes an exhaust portion which is spaced away from the ground engaging portion and the exhaust portion is arranged to mate with a hose; the outlet is disposed at a position within the tube so that when the ground engaging portion of the tube is driven into soil, compressed gas emanating from the outlet disrupts the soil inside the tube to form a hole in the soil.

2. A hole forming tool according to claim 1 wherein the tube is bent at a location spaced from the ground engaging portion to direct the disrupted soil away from the hole.

3. A hole forming tool according to claim 1 wherein the delivery means includes a pipe affixed to the inside of the shroud.

4. A hole forming tool according to claim 1 wherein the outlet is a nozzle including more than one flow path through which compressed gas emanates from the nozzle.

5. A hole forming tool according to claim 1 wherein the ground engaging portion is provided with serrations spaced around a periphery thereof.

6. A hole forming tool according to claim 1 including a pair of handles for grasping the tool to rotate and drive the tool into soil.

* * * * *